United States Patent [19]

Nalesnik

[11] Patent Number: 5,139,688
[45] Date of Patent: Aug. 18, 1992

[54] DISPERSANT AND ANTIOXIDANT ADDITIVE AND LUBRICATING OIL COMPOSITION CONTAINING SAME

[75] Inventor: Theodore E. Nalesnik, Wappingers Falls, N.Y.

[73] Assignee: Texaco, Inc., White Plains, N.Y.

[21] Appl. No.: 563,598

[22] Filed: Aug. 6, 1990

[51] Int. Cl.$^5$ ................ C10M 143/00; C10M 149/10
[52] U.S. Cl. ..................... 252/47.5; 252/50; 252/51.5 R; 252/55; 525/331.7; 525/375
[58] Field of Search ............... 525/331.7, 375; 252/50, 252/51.5 R, 47.5

[56] References Cited

U.S. PATENT DOCUMENTS

| | | | |
|---|---|---|---|
| 3,872,019 | 3/1975 | Culbertson et al. | 252/51.5 A |
| 4,089,794 | 5/1978 | Engel et al. | 252/51.5 A |
| 4,382,007 | 5/1983 | Chafetz, et al. | 252/55 |
| 4,640,788 | 2/1987 | Kapuscinski et al. | 252/54.6 |
| 4,863,623 | 9/1989 | Nalesnik | 252/50 |
| 5,013,469 | 5/1991 | DeRosa et al. | 252/51.5 A |
| 5,075,383 | 12/1991 | Wigdal et al. | 252/47.5 |

Primary Examiner—Ellen McAvoy
Attorney, Agent, or Firm—Robert A. Kulason; James J. O'Loughlin; Robert B. Burns

[57] ABSTRACT

An additive composition comprising an amine-derivatized oxidized copolymer prepared from ethylene and at least one $C_3$ to $C_{10}$ alpha-monoolefin and, optionally, a polyene selected from non-conjugated dienes and trienes comprising from about 15 to 30 mole percent of ethylene, from about 20 to 85 mole percent of said $C_3$ to $C_{10}$ alpha-monoolefin and from about 0 to 15 mole percent of said polyene having a number average molecular weight ranging from about 5,000 to 500,000 which has been reacted with a formaldehyde compound and an amino-aromatic polyamine compound from the group consisting of an N-arylphenylenediamine, an aminocarbazoly, an aminomercaptotriazole, and an aminoperimidine to form said amine-derivatized oxidized copolymer and a lubricating oil composition containing same are provided.

24 Claims, No Drawings

DISPERSANT AND ANTIOXIDANT ADDITIVE AND LUBRICATING OIL COMPOSITION CONTAINING SAME

BACKGROUND OF THE INVENTION

This invention relates to a novel multi-functional lubricant additive which is a dispersant and an antioxidant additive and in certain aspects, a VI improver when employed in a lubricating oil composition.

DISCLOSURE STATEMENT

Ethylene-propylene copolymers and terpolymers and derivatives thereof have been widely used as additives in lubricating oil compositions to provide dispersancy and/or VI improver properties. The following patents illustrate earlier developments in this field.

U.S. Pat. No. 3,872,019 discloses a bi-functional lubricant additive exhibiting dispersant and VI improving properties obtained by the Mannich condensation of an oxidized long-chain high molecular weight amorphous copolymer of essentially ethylene and propylene having a number average molecular weight of at least about 10,000 with a formaldehyde yielding reactant and a primary or secondary amine or polyamine.

U.S. Pat. No. 4,089,794 discloses ethylene copolymers derived from ethylene and one or more $C_3$ to $C_{28}$ alpha-olefin solution grafted with an ethylenically-unsaturated carboxylic acid material followed by a reaction with a polyfunctional material reactive with carboxyl groups, such as a polyamine, a polyol, or a hydroxyamine which reaction product is useful as a sludge and varnish control additive in lubricating oils.

U.S. Pat. No. 4,382,007 discloses a dispersant—VI improver prepared by reacting a polyamine-derived dispersant with an oxidized ethylene-propylene polymer or an ethylenepropylene diene terpolymer.

U.S. Pat. No. 4,863,623 discloses a VI improver, dispersant and antioxidant additive comprising an ethylene copolymer or terpolymer which has been grafted with an ethylenically unsaturated carboxylic function which is then further derivatized with an amino-aromatic polyamine compound.

Application Ser. No. 07/345,265 filed on May 1, 1989 discloses a dispersant-antioxidant additive and lubricating oil composition comprising a graft copolymer which has been derivatized with an amino-aromatic polyamine compound.

Co-pending application Ser. No. 07/507,550 filed on Apr. 11, 1990 discloses a dispersant and antioxidant additive and lubricating oil composition containing same comprising a graft copolymer having a molecular weight ranging from about 1,000 to 45,000 which has been derivatized with an amino-aromatic polyamine compound.

The disclosures in the foregoing patents which relate to VI improvers and dispersants for lubricating oils; namely, U.S. Pat. Nos. 4,089,794, 3,872,019, 4,382,007 and 4,863,623 are incorporated herein by reference.

An object of this invention is to provide a new class of oxidized copolymer additives for lubricating oils.

A further object is to provide novel lubricating oil compositions and additive concentrates containing the oxidized copolymer derivatives of the invention.

SUMMARY OF THE INVENTION

The novel additive of the invention comprises an oxidized ethylene copolymer or terpolymer of a $C_3$ to $C_{10}$ alpha-monoolefin and, optionally, a non-conjugated diene or triene which has been reacted with a formaldehyde compound and with an amino-aromatic polyamine compound from the group consisting of:

a) an N-arylphenylenediamine represented by the formula:

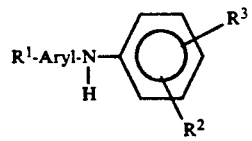

in which $R^1$ is H, —NHaryl, —NHarylalkyl, a branched or straight chain radical having from 4 to 24 carbon atoms that can be alkyl, akenyl, alkoxyl, aralkyl alkaryl, hydroxyalkyl or aminoalkyl, $R^2$ is —$NH_2$, —$(NH(CH_2)-_n)-_mNH_2$, —$NH_2CH_2$—aryl —$NH_2$ in which n and m has a value from to 10, $R^3$ is alkyl, alkenyl, alkoxyl, aralkyl, alkaryl, having from 4 to 24 carbon atoms, b) an aminocarbazole represented by the formula:

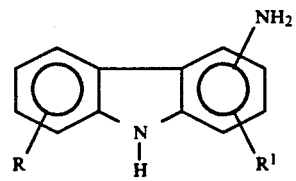

in which R and $R^1$ represent hydrogen or an alkyl or alkenyl radical having from 1 to 14 carbon atoms, c) an amino-indazolinone represented by the formula:

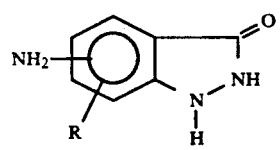

in which R is hydrogen or an alkyl radical having from 1 to 14 carbon atoms, d) an aminomercaptotriazole represented by the formula:

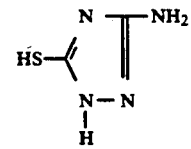

e) and an aminoperimidine represented by the formula:

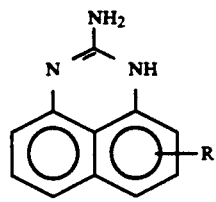

in which R represents hydrogen or an alkyl radical having from 1 to 14 carbon atoms.

The novel lubricant of the invention comprises an oil of lubricating viscosity and an effective amount of the novel reaction product. The lubricating oil will be characterized by having viscosity index improver, dispersancy, and antioxidant properties.

Oil concentrates of the reaction product of the invention are also contemplated.

DETAILED DESCRIPTION OF THE INVENTION

The polymer or copolymer substrate employed in the novel additive of the invention may be prepared from ethylene and propylene or it may be prepared from ethylene and a higher olefin within the range of $C_3$ to $C_{10}$ alpha-monoolefins.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norbornene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The polymerization reaction to form the polymer substrate is generally carried out in the presence of a catalyst in a solvent medium. The polymerization solvent may be any suitable inert organic solvent that is liquid under reaction conditions for solution polymerization of monoolefins which is generally conducted in the presence of a Ziegler-type catalyst. Examples of satisfactory hydrocarbon solvents include straight chain paraffins having from 5 to 8 carbon atoms, with hexane being preferred. Aromatic hydrocarbons, preferably aromatic hydrocarbons having a single benzene nucleus, such as benzene, toluene, and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. It is desirable that the solvent be free of substances that will interfere with a Ziegler polymerization reaction.

In a typical preparation of a polymer substrate, hexane is first introduced into a reactor and the temperature in the reactor is raised moderately to about 30° C. Dry propylene is fed to the reactor until the pressure reaches about 40 to 45 inches of mercury. The pressure is then increased to about 60 inches of mercury and dry ethylene and 5-ethylidene-2-norbornene are fed to the reactor. The monomer feeds are stopped and a mixture of aluminum sesquichloride and vanadium oxytrichloride are added to initiate the polymerization reaction. Completion of the polymerization reaction is evidenced by a drop in the pressure in the reactor.

Ethylene-propylene or higher alpha-monoolefin copolymers may consist of from about 15 to 80 mole percent ethylene and from about 20 to 85 mole percent propylene or higher monoolefin with the preferred mole ratios being from about 25 to 75 mole percent ethylene and from about 25 to 75 mole percent of a $C_3$ to $C_{10}$ alpha-monoolefin with the most preferred proportions being from 25 to 55 mole percent ethylene and 45 to 75 mole percent propylene.

Terpolymer variations of the foregoing polymers may contain from about 0.1 to 10 mole percent of a non-conjugated diene or triene.

The polymer substrate, i.e., the ethylene copolymer or terpolymer, is an oil-soluble, substantially linear, rubbery material having a number average molecular weight from about 5,000 to 500,000 with a preferred molecular weight range of 25,000 to 250,000 and a most preferred range from about 50,000 to 150,000.

Polymer substrates or interpolymers are available commercially. Particularly useful are those containing from about 40 to about 60 mole percent ethylene units, about 60 to about 40 mole percent propylene units. Examples are "Ortholeum 2052" and "PL-I256" available from E. I. duPont de Nemours and Co. The former is a terpolymer containing about 48 mole percent ethylene units, 48 mole percent propylene units and 4 mole percent 1,4-hexadiene units, having an inherent viscosity of 1.35. The latter is a similar polymer with an inherent viscosity of 1.95. The viscosity average molecular weights of the two are on the order of 200,000 and 280,000, respectively.

Oxidation of the copolymer can be accomplished by contacting the copolymer under suitable conditions of temperature and at atmospheric or elevated pressures, with an oxidizing agent, such as free oxygen, or any oxygen-containing material capable of releasing oxygen under the oxidation conditions. If desired, the oxidation can be conducted in the presence of known oxidation catalysts, such as platinum or a platinum group metal, and compounds containing metals such as copper, iron, cobalt, cadmium, manganese, vanadium, etc.

Generally, the oxidation can be carried out over a wide temperature range, depending upon the oxidizing agent used: for example, with an active oxidizing agent, e.g., alkyl sulfonate magnesium or calcium salts, temperatures in the range of $-40°$ F. to $400°$ F. have been used, while with less active oxidizing agents, e.g., air, temperatures in the range of $100°$ F. to $800°$ F. have been used. Further, depending upon the rate desired, the oxidation can be conducted at sub-atmospheric, atmospheric or super-atmospheric pressures, and in the presence or absence of oxidation catalysts.

The aldehydes suitable for use in accordance with the present invention are aliphatic aldehydes, such as, for example, formaldehyde, acetaldehyde, and b-hydroxybutyraldehyde. We prefer to use formaldehyde or a formaldehyde-yielding compound such as paraformaldehyde and formalin.

The amine reactant for the additive of the invention is an amino-aromatic polyamine compound from the group consisting of:

a) an N-arylphenylenediamine represented by the formula:

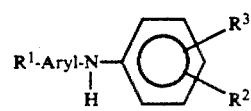

in which R¹ is H, —NHaryl, -NHarylalkyl, a branched or straight chain radical having from 4 to 24 carbon atoms that can be alkyl, akenyl, alkoxyl, aralkyl alkaryl, hydroxyalkyl or aminoalkyl, R² is —NH₂, —(NH(CH₂)—ₙ)—ₘNH₂, —CH₂—aryl—NH₂ in which n and m has a value from to 10, R³ is alkyl, alkenyl, alkoxyl, aralkyl, alkaryl, having from 4 to 24 carbon atoms, b) an aminocarbazole represented by the formula:

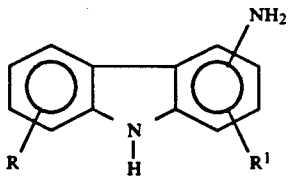

in which R and R¹ represent hydrogen or an alkyl or alkenyl radical having from 1 to 14 carbon atoms, c) an amino-indazolinone represented by the formula:

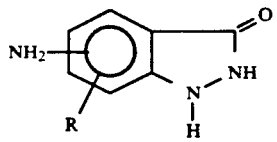

in which R is hydrogen or an alkyl radical having from 1 to 14 carbon atoms, d) an aminomercaptotriazole represented by the formula:

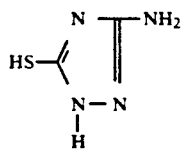

e) and an aminoperimidine represented by the formula:

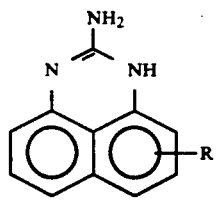

in which R represents hydrogen or an alkyl radical having from 1 to 14 carbon atoms.

Particularly preferred N-arylphenylenediamines are N-phenylphenylenediamines, for example, N-phenyl-1,4-phenylenediamine, N-phenyl-1,3-phenylenediamine, and N-phenyl-1,2-phenylenediamine and N-naphthyl-1,4-phenylenediamine. Other polyamines of NPPDA may also be included, such as N-aminopropyl-N'-phenylphenylenediamine.

The reaction between the oxidized polymer substrate, the formaldehyde compound and the prescribed aminoaromatic polyamine compound is conducted by heating an oil solution of the oxidized polymer substrate under inert conditions and then adding the amino-aromatic polyamine compound to the heated solution together with an acidic catalyst promoter. It is convenient to employ an oil solution of the polymer substrate heated to 140° C. to 200° C. while maintaining the solution under a nitrogen blanket. The formaldehyde compound is then very slowly added to this solution and the reaction is effected under the noted conditions.

The herein described reaction products of the present invention are effective bifunctional dispersant and VI improving additives in oleaginous lubricant compositions when used in amounts of from about 0.1 to about 10 percent. Suitable lubricating base oils are mineral oils, i.e., petroleum oils, synthetic lubricating oils, such as those obtained by the polymerization of hydrocarbons, and other well-known synthetic lubricating oils, and lubricating oils of animal or vegetable origin. Concentrates of a suitable oil base containing more than 10, i.e., from about 10 percent to about 75 percent or more, of the additive of the present invention, alone or in combination with other well-known additives, can be used for blending with lubricating oils in proportions desired for particular conditions or use to give a finished product containing from about 0.1 to about 10 percent of bifunctional additive of this invention.

The following examples illustrate the preparation of the novel reaction product additive of the invention.

EXAMPLE I (COMPARISON)

654 grams of an ethylene-propylene copolymer having a number average molecular weight of about 80,000 and 1954 grams of solvent neutral oil having an SUS Viscosity at 100° F. of 100 were admixed in a vessel equipped with a gas inlet bubbler, gas exit tube, thermometer, and a mechanical stirrer. The ethylene-propylene copolymer rubber was dissolved in the oil at 160° C. with stirring under a nitrogen blanket.

The temperature of the reaction mixture was raised to 205° C. and 8 grams of calcium hydroxide overbased calcium alkyl sulfonate and 8 grams of magnesium alkyl sulfonate (Witco N-300) were added to the reaction mixture. A 50:50 air:nitrogen mixture was bubbled through the heated reaction mixture at a rate of 600 milliliters per minute for a period of seven hours while the mixture was rapidly stirred. The reaction mixture was cooled to room temperature and screen filtered.

EXAMPLE II (COMPARISON)

156 grams of the oxidized ethylene-propylene copolymer of Example I above and 144 grams of solvent neutral oil were added to a reactor equipped with a mechanical stirrer, thermometer, nitrogen inlet and outlet. The reaction mixture was blanketed with nitrogen and the temperature raised to 180° C. 2.9 grams of alkyl sulfonic acid and 1.53 grams of hexamethylenediamine were added to the reaction mixture.

1.0 grams of paraformaldehyde was slowly added to the reaction mixture which was maintained at about 180° C. under a nitrogen blanket. The reaction was conducted for two hours and then the reaction product was cooled and screened filtered (100 mesh).

EXAMPLE III (COMPARISON)

654 grams of an ethylene-propylene diene terpolymer (Ortholeum 2052 EPDM) and 1954 grams of solvent neutral oil were admixed as in Example I. 8 grams of over-based calcium alkyl sulfonate and 8 grams of magnesium alkyl sulfonate were added to a nitrogen blanketed mixture which was maintained at a temperature of about 205° C. A 50/50 air-nitrogen mixture was bubbled through the reaction mixture at a rate of 600 milliliters per minute for a period of seven hours while the reaction mixture was maintained under constant stirring. The reaction mixture was then cooled and screen filtered.

EXAMPLE IV (COMPARISON)

200 grams of the oxidized ethylene-propylene diene terpolymer prepared in Example III was admixed with 200 grams of solvent neutral oil. 2.5 grams of alkyl sulfonic acid and 2 grams of hexamethylenediamine were added to the reaction mixture. 0.3 grams of paraformaldehyde was then slowly added while the reaction mixture was maintained at 180° C. under a nitrogen blanket for about two hours. The reaction product was cooled and screen filtered.

EXAMPLE V 200 grams of the oil solution of the oxidized ethylene-propylene copolymer prepared in Example I were reacted with 2 grams of N-phenylphenylenediamine and 0.3 grams of paraformaldehyde in the presence of 2.5 grams of alkyl sulfonic acid following the procedure described in Example II.

EXAMPLE VI 200 grams of the oil solution of the oxidized ethylene-propylene diene terpolymer prepared in Example III were reacted with 2 grams of N-phenylphenylenediamine and 0.3 grams of paraformaldehyde in the presence of 2.5 grams of alkyl sulfonic acid following the procedure described in Example II.

EXAMPLE VII 200 grams of the oil solution of the oxidized ethylene-propylene copolymer of Example I were reacted with 2 grams of N-aminopropyl-N-phenylphenylenediamine and 0.3 grams of paraformaldehyde in the presence of alkyl sulfonic acid following the procedure described in Example II.

EXAMPLE VIII 200 grams of the oil solution of the oxidized ethylene-propylene diene terpolymer described in Example III were reacted with 2 grams of N-aminopropyl-N-phenylphenylenediamine and 0.3 grams of paraformaldehyde in the presence of 2.5 grams of alkyl sulfonic acid following the procedure described in Example II.

In the experiments listed above, making products derived from the amino-aromatic antioxidants (Examples V, VI, VII and VIII), solid insoluble side products may appear. These materials may be removed by diluting the product with hexane and centrifuging, followed by removal of hexane under vacuum.

The antioxidant properties and dispersancy properties of the additives of the invention were tested in two standard tests. The Bench Oxidation Test (BOT) was used to measure the antioxidant properties of the polymer. This test measures the relative increase of the carbonyl absorption band of 1710 cm$^{-1}$ of an oxidized oil, over that of the starting material.

This test is conducted in a 2 liter, 4-neck resin kettle equipped with a thermometer, condenser, gas bubbling tube and a mechanical stirrer. The polymer (1.5 wt. % of a 12.5 concentrate) was added along with SNO-7 oil totaling 1160 grs. The reaction mixture was stirred and purged with nitrogen for 30 minutes. The solution was then heated to 150° C. and initial samples were taken (0 hr. samples). The oxidation is started by switching from a nitrogen purge to one of air at a rate of 500 ml/min. The stirring rate is kept between 675 and 700 rpms. Samples are taken periodically using a syringe and evacuated test tubes. They are then quickly stored in a refrigerator to quench the oxidation. BOT DIR values are obtained by using a Differential Infrared technique (DIR) in which the carbonyl absorption band at 1710 cm$^{-1}$ of the zero hour sample, is subtracted from that of the final product (144 hrs.).

EVALUATION OF DISPERSANCY PROPERTIES

The dispersancy of the additives was evaluated in the Bench Sludge Test (BST) which measures the ability of a dispersant to solubilize particles in the oil. This test is conducted by heating the test oil mixed with a synthetic hydrocarbon blow-by and a diluent oil at a fixed temperature for a fixed time period. After heating, the turbidity of the resulting mixture is measured. A low percentage turbidity (0–10) is indicative of good dispersancy while an intermediate value (20–40) indicates intermediate dispersancy and a high value (40–100) indicate an increasingly poor dispersancy. The additives were tested at a 10.0 wt. % treating dosage in an SAE 10W-30 formulation and compared to good, fair and poor references.

The results of the tests are set forth in Table I below.

TABLE I

| DISPERSANT - ANTIOXIDATION PERFORMANCE OF MANNICH BASE ADDITIVES | | | |
|---|---|---|---|
| Example | Oxidized Polymer/Amine | BOT(2) | BVCT(1) |
| I | EPM/none | 61 | 98 |
| II | EPM/Hexamethylenediamine | 32 | 35 |
| V | EPM/N-Phenylphenylenediamine | 10 | 52 |
| VII | EPM/N-aminopropyl-N'-phenylphenylenediamine | 5 | 71 |
| III | EPDM/none | 7 | >90 |
| IV | EPDM/Hexamethylenediamine | 7 | 33 |
| VI | EPDM/N-Phenylphenylenediamine | 0 | 72 |
| VIII | EPDM/N-aminopropyl-N'-phenylphenylenediamine | 0 | 73 |

EPM: Ethylene propylene copolymer
EPDM: Ortholeum 2052 (ethylene propylenediene terpolymer)
(1) The smaller the value, the better the antioxidant protection.
(2) The smaller the value, the better the dispersancy.
All above additives were prepared at approximately 13 wt. % polymer contents.

The novel additives of the invention in which the amine component was an amino-aromatic polyamine, Examples V, VI, VII and VIII exhibited outstanding antioxidant properties as well as dispersant properties, making them highly effective lubricating oil additives.

What is claimed is:

1. An additive reaction product prepared by reacting a polymer prepared from ethylene and at least one $C_3$ to $C_{10}$ alpha-monoolefin and, optionally, a polyene selected from non-conjugated dienes and trienes comprising from about 15 to 80 mole percent of ethylene, from about 20 to 85 mole percent of said $C_3$ to $C_{10}$ alphamonoolefin, and from about b 0 to 15 mole percent of said polyene and having a number average molecular weight ranging from about 5,000 to 500,000, with an oxygen-containing gas at an elevated temperature in the range of 100° F. to 800° F. to produce an oxidized polymer and reacting said oxidized polymer with a formaldehyde-yielding reactant and an amino-aromatic polyamine compound selected from the group consisting of:

a) an N-arylphenylenediamine represented by the formula:

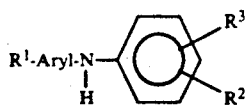

in which R¹ is H, —NHaryl, —NHarylalkyl, a branched or straight chain radical having from 4 to 24 carbon atoms that can be alkyl, akenyl, alkoxyl, aralkyl alkaryl, hydroxyalkyl or aminoalkyl, R² is —NH₂, —(NH(CH₂)—ₙ—ₘNH₂, —CH₂—aryl—NH₂ in which n and m has a value from 1 to 10, R³ is alkyl, alkenyl, alkoxyl, aralkyl, alkaryl, having from 4 to 24 carbon atoms, b) an aminocarbazole represented by the formula:

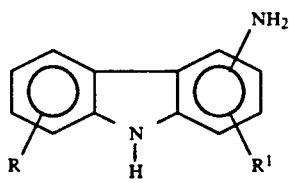

in which R and R¹ represent hydrogen or an alkyl or alkenyl radical having from 1 to 14 carbon atoms.

c) an amino-indazolinone represented by the formula:

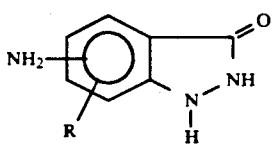

in which R is hydrogen or an alkyl radical having from 1 to 14 carbon atoms, d) an aminomercaptotriazole represented by the formula:

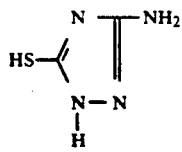

e) and an aminoperimidine represented by the formula:

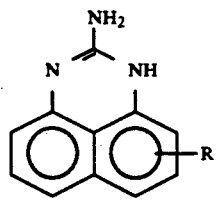

in which R represents hydrogen or an alkyl radical having from 1 to 14 carbon atoms.

2. An additive reaction product according to claim 1 in which said polymer has a number average molecular weight from about 25,000 to 250,000.

3. An additive reaction product according to claim 1 in which said polymer has a number average molecular weight from about 50,000 to 150,000.

4. An additive reaction product according to claim 1 in which said polymer comprises from about 25 to 75 mole percent ethylene and from about 25 to 75 mole percent of a C₃ to C₈ alpha-monoolefin.

5. An additive reaction product according to claim 1 in which said polymer comprises from about 25 to 55 mole percent ethylene and from about 45 to 75 mole percent of propylene.

6. An additive reaction product according to claim 4 which contains from about 0.1 to 10 mole percent of a polyene.

7. An additive reaction product according to claim in which said formaldehyde-yielding reactant is paraformaldehyde.

8. An additive reaction product according to claim 1 in which said formaldehyde-yielding reactant is acetaldehyde.

9. An additive reaction product according to claim 1 in which said amino-aromatic polyamine compound is an N-aryl or N-alkyl substituted phenylenediamine.

10. An additive reaction product according to claim 9 in which said amino-aromatic polyamine compound is an N-phenylphenylenediamine.

11. An additive reaction product according to claim 9 in which said amino-aromatic polyamine compound is N-aminopropyl-N'-phenylphenylenediamine.

12. A lubricating oil composition comprising a major amount of an oil of lubricating viscosity and a minor amount effective to impart dispersancy, and antioxidant properties to said oil of an additive reaction product prepared by reacting a polymer prepared from ethylene and at least one C₃ to C₁₀ alpha-monoolefin and, optionally, a polyene selected from non-conjugated dienes and trienes comprising from about 15 to 80 mole percent ethylene, about 20 to 85 mole percent of said C₃ to C₂₀ alpha-monoolefin and from about 0 to 15 mole percent of said polyene, and having a number average molecular weight ranging from about 5,000 to 500,000, with an oxygen-containing gas at an elevated temperature in the range of 100° F. to 800° F. to produce an oxidized polymer a reacting said oxidized polymer with a formaldehyde-yielding reactant and an amino-aromatic polyamine compound selected from the group consisting of:

a) an N-arylphenylenediamine represented by the formula:

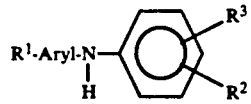

in which R¹ is H, —NHaryl, —NHarylalkyl, a branched or straight chain radical having from 4 to 24 carbon atoms that can be alkyl, akenyl, alkoxyl, aralkyl alkaryl, hydroxyalkyl or aminoalkyl, R² is NH₂, —(NH(CH₂)—ₙ)—ₘNH₂, —CH₂—aryl—NH₂ in which n and m has a value from 1 to 10, R³ is alkyl, alkenyl, alkoxyl, aralkyl, alkaryl, having from 4 to 24 carbon atoms, b) an aminocarbazole represented by the formula:

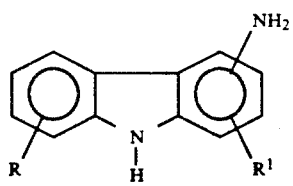

in which R and R¹ represent hydrogen or an alkyl or alkenyl radical having from 1 to 14 carbon atoms, c) an amino-indazolinone represented by the formula:

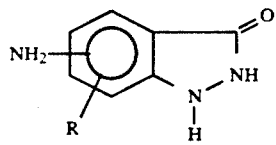

in which R is hydrogen or an alkyl radical having from 1 to 14 carbon atoms, d) an aminomercaptotriazole represented by the formula:

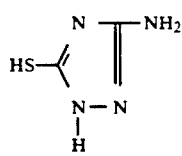

e) and an aminoperimidine represented by the formula:

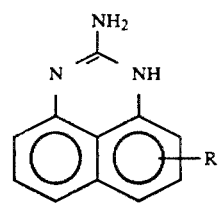

in which R represents hydrogen or an alkyl radical having from 1 to 14 carbon atoms.

13. A lubricating oil composition according to claim 12 containing from about 0.1 to 30.0 weight percent of said additive based on the total weight of the oil composition.

14. A lubricating oil composition according to claim 12 containing from about 1 to 15.0 weight percent of said additive based on the total weight of the oil composition.

15. A lubricating oil composition according to claim 12 in which said polymer comprises from about 25 to 75 mole percent ethylene and from about 25 to 75 mole percent of a $C_3$ to $C_8$ alpha-monoolefin and has a number average molecular weight ranging from about 25,000 to 250,000.

16. An additive reaction product according to claim 1 in which said N-arylphenylenediamine is N-phenyl-1,4-phenylenediamine.

17. An additive reaction product according to claim 1 in which said N-arylphenylenediamine is N-phenyl-1,3-phenylenediamine.

18. A lubricating oil composition according to claim 12 in which said N-arylphenylenediamine is N-phenyl-1,4-phenylenediamine.

19. A lubricating oil composition according to claim 12 in which said N-phenylphenylenediamine is N-phenyl-1,3-phenylenediamine.

20. A lubricating oil composition according to claim 12 in which said amino-aromatic polyamine compound is N-naphthyl-1,4-phenylenediamine.

21. A lubricating oil composition according to claim 12 in which said amino-aromatic polyamine compound is N-aminopropyl-N-phenylenediamine.

22. A lubricating oil composition according to claim 12 in which said formaldehyde-yielding reactant is paraformaldehyde.

23. A lubricating oil composition according to claim 12 in which formaldehyde is a reactant.

24. A concentrate for a lubricating oil comprising a diluent oil of lubricant viscosity and from about to 50 weight percent of the additive composition of claim 1 based on the total weight of the concentrate.